United States Patent
St. John et al.

(10) Patent No.: US 9,624,623 B2
(45) Date of Patent: *Apr. 18, 2017

(54) EMULSIFICATION OF ALKENYL SUCCINIC ANHYDRIDE WITH AN AMINE-CONTAINING HOMOPOLYMER OR COPOLYMER

(71) Applicant: Ecolab USA Inc., Naperville, IL (US)

(72) Inventors: Michael R. St. John, Chicago, IL (US); David J. Castro, DeKalb, IL (US); Mei Liu, Plainfield, IL (US)

(73) Assignee: ECOLAB USA INC., Napersville, IL (US)

(*) Notice: Subject to any disclaimer, the term of this patent is extended or adjusted under 35 U.S.C. 154(b) by 232 days.

This patent is subject to a terminal disclaimer.

(21) Appl. No.: 14/507,062

(22) Filed: Oct. 6, 2014

(65) Prior Publication Data

US 2015/0020988 A1    Jan. 22, 2015

Related U.S. Application Data

(63) Continuation of application No. 13/677,546, filed on Nov. 15, 2012, now Pat. No. 8,852,400, which is a continuation-in-part of application No. 12/938,017, filed on Nov. 2, 2010, now Pat. No. 8,709,207.

(51) Int. Cl.
| | | |
|---|---|---|
| *D21H 21/16* | (2006.01) | |
| *D21H 17/56* | (2006.01) | |
| *C08L 33/26* | (2006.01) | |
| *D21H 17/16* | (2006.01) | |
| *D21H 17/55* | (2006.01) | |

(52) U.S. Cl.
CPC ............ *D21H 21/16* (2013.01); *D21H 17/16* (2013.01); *D21H 17/55* (2013.01); *D21H 17/56* (2013.01); *C08L 33/26* (2013.01)

(58) Field of Classification Search
USPC ....... 162/158, 164.1, 168.1–168.3, 183–185; 549/228–233; 524/112
See application file for complete search history.

(56) References Cited

U.S. PATENT DOCUMENTS

| | | |
|---|---|---|
| 3,102,064 A | 8/1963 | Wurzburg |
| 3,234,076 A | 2/1966 | Goldsmith |
| RE28,474 E | 7/1975 | Anderson et al. |
| RE28,576 E | 10/1975 | Anderson et al. |
| 3,968,005 A | 7/1976 | Wurzburg |
| 4,040,900 A | 8/1977 | Mazzarella et al. |
| 4,533,434 A | 8/1985 | Yoshioka et al. |
| 4,657,946 A | 4/1987 | Rende et al. |
| 4,915,786 A | 4/1990 | Sweeney |
| 4,956,399 A | 9/1990 | Kozakiewicz et al. |
| 5,324,792 A * | 6/1994 | Ford .................. C08F 8/12 525/328.2 |
| 5,438,087 A | 8/1995 | Ikeda et al. |
| 5,865,951 A | 2/1999 | Kawakami et al. |
| 6,348,132 B1 | 2/2002 | Zhang et al. |
| 6,787,574 B1 | 9/2004 | Farley et al. |
| 7,455,751 B2 | 11/2008 | Ward et al. |
| 7,550,060 B2 | 6/2009 | Jacobson et al. |
| 7,914,646 B2 | 3/2011 | Duggirala et al. |
| 8,852,400 B2 * | 10/2014 | St. John ............... D21H 17/56 162/158 |
| 2003/0224945 A1 | 12/2003 | Twu et al. |
| 2006/0201645 A1 | 9/2006 | Ito |
| 2009/0281212 A1 * | 11/2009 | Pawlowska ............ D21H 21/16 524/47 |
| 2012/0103546 A1 | 5/2012 | Maniere |
| 2012/0103547 A1 | 5/2012 | Grimm et al. |

FOREIGN PATENT DOCUMENTS

| | | |
|---|---|---|
| EP | 0151994 A2 | 8/1985 |
| JP | 06-299494 A | 10/1994 |
| JP | 2012-107356 A | 6/2012 |
| WO | WO 97/05330 A1 | 2/1997 |
| WO | WO 97/10387 A1 | 3/1997 |

OTHER PUBLICATIONS

Smook, Gary A., Handbook for Pulp and Paper Technologists, 2nd ed, Angus Wilde Publications, 1992, pp. 220-227.*
Farley et al., "Sizing with Alkenyl Succinic Anhydride," *The Sizing of Paper*, 2nd. ed., Tappi Press, pp. 51-62, 1989.
Friberg et al., "Emulsions," *Encyclopedia of Chemical Technology*, 4th ed., vol. 9, Dec. 4, 2000.
European Patent Office, Extended European Search Report in European Patent Application No. 13855150.2, Jun. 15, 2016, 12 pp.

* cited by examiner

*Primary Examiner* — Dennis Cordray
(74) *Attorney, Agent, or Firm* — Leydig, Voit & Mayer, Ltd.

(57) ABSTRACT

The present disclosure provides for a method of preparing and using an emulsion for treating a papermaking process. The emulsion is an oil-in-water emulsion of alkenyl succinic anhydride emulsified with a polymer comprising at least one primary or secondary amine containing monomer. The method comprises adding an oil-in-water emulsion to the papermaking process; wherein the oil-in-water emulsion comprises alkenyl succinic anhydride emulsified with a polymer comprising at least one primary or secondary amine containing monomer; and wherein the oil-in-water emulsion is added in an amount sufficient to improve sizing of the paper produced by the papermaking process. The primary or secondary amine may be a secondary amine comprising diallylamine, and the polymer may be a diallylamine-acrylamide copolymer.

20 Claims, No Drawings

EMULSIFICATION OF ALKENYL SUCCINIC ANHYDRIDE WITH AN AMINE-CONTAINING HOMOPOLYMER OR COPOLYMER

This application is a continuation application of U.S. patent application Ser. No. 13/677,546, filed Nov. 15, 2012, and a continuation-in-part application of U.S. Pat. No. 8,709,207, filed Nov. 2, 2010, issued Apr. 9, 2014, the disclosures of which are incorporated herein by reference in their entirety.

FIELD OF THE INVENTION

This disclosure relates generally to a novel composition and method for improving paper and paperboard production. More specifically, the disclosure relates to a composition and method for using alkenyl succinic anhydride in combination with a diallylamine-containing polymer as a sizing emulsion in the papermaking process. The disclosure has particular relevance to the application of such compounds in sizing emulsion compositions as replacements for traditional polymers.

BACKGROUND

A resistance to hydrophilic liquid penetration (normally water), known as "sizing," is an important property of paper, both in the papermaking process and in the final product. For example, the extent to which a paper is weakened by the rewetting at the size press during production is influenced by its degree of sizing. Additionally, a high level of internal sizing of a sheet contributes to the sheet's structural stability in environments where the sheet may come in contact with liquid water. Beverage and food packaging are typical examples of the use of board and paper products where a high level of sizing is desirable.

Generally, resistance to water penetration is achieved by the introduction of a sizing agent at the wet end of the papermaking process. A common sizing agent is alkenyl succinic anhydride ("ASA"). ASA-containing materials are used to impart a degree of hydrophobicity to paper fibers during production, and an overall resistance to liquid absorption to the finished paper product. A drawback to using ASA as a sizing material is that ASA is not water soluble and typically must be uniformly suspended in the pulp as an emulsion so that the ASA can make adequate contact with the cellulosic fibers and, thus, create the desired effect on the final product. A conventional sizing program is disclosed in U.S. Pat. No. 4,657,946 to Rende et al., the disclosure of which is hereby incorporated by reference in its entirety.

SUMMARY OF THE INVENTION

The present disclosure provides for a method of treating a papermaking process. The method comprises adding an oil-in-water emulsion to the papermaking process. The oil-in-water emulsion comprises alkenyl succinic anhydride emulsified with a polymer comprising at least one primary or secondary amine containing monomer. The oil-in-water emulsion is added in an amount sufficient to improve sizing of the paper produced by the papermaking process.

The present disclosure alternatively provides for an oil-in-water emulsion comprising alkenyl succinic anhydride emulsified with a polymer comprising at least one primary or secondary amine containing monomer.

As it pertains to both the method and the composition, the oil-in-water emulsion may comprise from 0.01 weight percent to 40 weight percent alkenyl succinic anhydride. The oil-in-water emulsion may comprise from 0.001 weight percent to 20 weight percent polymer.

DETAILED DESCRIPTION OF THE INVENTION

While the embodiments described herein may take various forms, there will hereinafter be described presently preferred embodiments with the understanding that the present disclosure is to be considered merely an exemplification and is not intended to limit the disclosure to the specific embodiments illustrated.

It should be further understood that the title of this section of this specification, namely, "Detailed Description of the Invention," relates to a requirement of the United States Patent Office, and does not imply, nor should be inferred to limit the subject matter disclosed herein.

The present disclosure provides for a method of treating a papermaking process. The method comprises adding an oil-in-water emulsion to the papermaking process. The oil-in-water emulsion comprises alkenyl succinic anhydride emulsified with a polymer comprising at least one primary or secondary amine containing monomer. The oil-in-water emulsion is added in an amount sufficient to improve sizing of the paper produced by the papermaking process.

The present disclosure alternatively provides for an oil-in-water emulsion comprising alkenyl succinic anhydride emulsified with a polymer comprising at least one primary or secondary amine containing monomer.

As it pertains to both the method and the composition, the oil-in-water emulsion may comprise from 0.01 weight percent to 40 weight percent alkenyl succinic anhydride. The oil-in-water emulsion may comprise from 0.001 weight percent to 20 weight percent polymer. The following definitions are intended to be clarifying and are not intended to be limiting.

As it pertains to this disclosure, "papermaking process" means a method of making paper and paperboard products from pulp comprising forming an aqueous cellulosic papermaking furnish (optionally, with mineral fillers, such as calcium carbonates, clays, etc.), draining the furnish to form a sheet, and drying the sheet. It should be appreciated that any suitable furnish may be used. Representative furnishes include, for example, virgin pulp, recycled pulp, kraft pulp (bleached and unbleached), sulfite pulp, mechanical pulp, polymeric plastic fibers, the like, any combination of the foregoing pulps. The steps of forming the papermaking furnish, draining and drying may be carried out in any manner generally known to those skilled in the art. In addition to the sizing emulsions herein described, other papermaking additives may be utilized as adjuncts with the polymer treatment of this invention. Such papermaking additives include, for example, retention aids (e.g., microparticles, flocculants, polymeric and inorganic coagulants, etc.), wet and dry strength additives (e.g., cationic starches, polyamidoamine epichlorohydrin-based polymers), the like, and combinations of the foregoing.

As it pertains to this disclosure, "paper" and "sheet" are used interchangeably to mean an intermediate or product of a papermaking process made from an aqueous cellulosic papermaking furnish (optionally, with mineral fillers, such as calcium carbonates, clays, etc.) that has been formed into a layer. Depending on the context, paper or sheet could mean an intermediate or a product of a papermaking process.

As it pertains to this disclosure, "polymer" means homopolymer, copolymer, or any organic chemical composition made up of bonded repeating "mer" units unless the particular context makes clear that one species is intended.

Disclosed herein are polymers comprising primary and/or secondary amines, which will serve as surprisingly effective emulsifiers for alkenyl succinic anhydride as compared to the conventional water soluble quaternary amines. In certain embodiments, the polymers are water soluble polymers. While not wishing to be bound by the following theory, it is believed that the primary and/or secondary amines are somehow reactive with ASA, allowing the emulsified ASA to perform as a "polymeric" size as opposed to a conventional "small molecule" size.

As previously discussed, the polymers that are useful in the oil-in-water emulsions disclosed herein comprise alkenyl succinic anhydride emulsified with a polymer comprising at least one primary or secondary amine containing monomer (The phrase "amine-containing polymer" is used interchangeably herein with the phrase "a polymer comprising at least one primary or secondary amine containing monomer"). In certain embodiments, such amine-containing polymers have a molecular weight greater than 10,000 Daltons, but preferably below 2,000,000 Daltons, where at least 1 mole percent and up to 99 mole percent of the mer content of the polymer is a polymerizable primary and/or secondary amine-containing monomer. In certain embodiments, the amine-containing polymer have molecular weights from 200,000 to 1,500,000 Daltons. In certain embodiments, at least ten mole percent and up to 60 mole percent of the mer units are amine containing vinyl- or allyl-monomers. In certain embodiments, the amine-containing monomer in the polymer is diallylamine.

In certain embodiments, the amine-containing polymer include a polymer with randomly distributed repeating monomer units derived from at least one of the following structures: Formulae I, II and/or their salt forms thereof, and/or Formula III and/or its hydrolyzed form after polymerization, denoted as Formula IIIA, where x=z=0, if the formamide is 100% hydrolized:

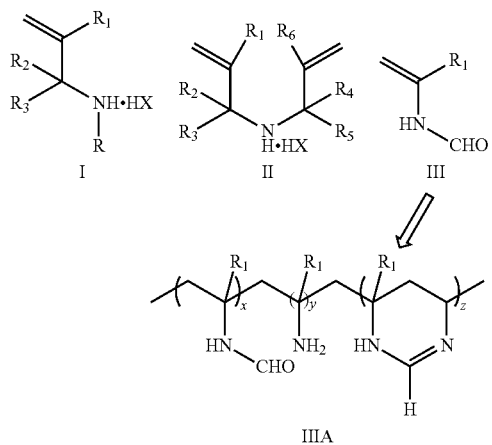

wherein R can be hydrogen or alkyl; $R_1$, $R_2$, $R_3$, $R_4$, $R_5$, $R_6$ are, independently selected from hydrogen, alkyl, or alkoxylalkyl. Formulae I, II, III, and IIIA independently may each be 0 mole percent. However, in certain embodiments where at least one of Formula I, II, III, and/or IIIA is utilized, the sum of Formulae I, II, III, and/or IIIA is from one mole percent up to 99 mole percent, based upon the amine-containing polymer or copolymer.

As previously discussed, in certain embodiments, the amine-containing polymer is a copolymer. Various co-monomer(s) may be useful, including, but not limited to, one or more vinyl addition monomers including non-ionic, cationic, anionic, and zwitterionic, with non-ionic and cationic being the preferred co-monomers. The co-monomer(s) is preferably water-soluble or at least results in a water-soluble copolymer.

Representative non-ionic co-monomers include acrylamide, methacrylamide, N,N-dimethylacrylamide, N,N-diethylacrylamide, N-isopropylacrylamide, N-vinylformamide, N-vinylmethylacetamide, N-vinyl pyrrolidone, hydroxyethyl methacrylate, hydroxyethyl acrylate, hydroxypropyl acrylate, hydroxypropyl methacrylate, N-t-butylacrylamide, N-methylolacrylamide, vinyl acetate, vinyl alcohol, similar monomers, and combinations thereof. In certain embodiments, the co-monomer is acrylamide.

Representative anionic co-monomers include acrylic acid and its salts, including, but not limited to sodium acrylate and ammonium acrylate; methacrylic acid and its salts, including, but not limited to sodium methacrylate and ammonium methacrylate; 2-acrylamido-2-methylpropanesulfonic acid ("AMPS"); the sodium salt of AMPS; sodium vinyl sulfonate; styrene sulfonate; maleic acid and its salts, including, but not limited to the sodium salt, the ammonium salt, sulfonate, itaconate, sulfopropyl acrylate or methacrylate or other water-soluble forms of these or other polymerizable carboxylic or sulfonic acids; sulfomethylated acrylamide; allyl sulfonate; sodium vinyl sulfonate; itaconic acid; acrylamidomethylbutanoic acid; fumaric acid; vinylphosphonic acid; vinylsulfonic acid; allylphosphonic acid; sulfomethylated acrylamide; phosphonomethylated acrylamide; itaconic anhydride; similar monomers, and combinations thereof.

Representative cationic co-monomers or mer units of the primary or secondary amine include dialkylaminoalkyl acrylates and methacrylates and their quaternary or acid salts, including, but not limited to, dimethylaminoethyl acrylate methyl chloride quaternary salt ("DMAEA.MCQ"), dimethylaminoethyl acrylate methyl sulfate quaternary salt, dimethyaminoethyl acrylate benzyl chloride quaternary salt, dimethylaminoethyl acrylate sulfuric acid salt, dimethylaminoethyl acrylate hydrochloric acid salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate, diallyldiethylammonium chloride and diallyldimethyl ammonium chloride ("DADMAC"), similar monomers, and combinations thereof. When present, alkyl groups are generally $C_1$ to $C_4$ alkyl.

Representative zwitterionic co-monomers include N,N-dimethyl-N-acryloyloxyethyl-N-(3-sulfopropyl)-ammonium betaine; N,N-dimethyl-N-acrylamidopropyl-N-(2-carboxymethyl)-ammonium betaine; N,N-dimethyl-N-acrylamidopropyl-N-(3-sulfopropyl)-ammonium betaine; N,N-dimethyl-N-acrylamidopropyl-N-(2-carboxymethyl)-ammonium betaine; 2-(methylthio)ethyl methacryloyl-S-(sulfopropyl)-sulfonium betaine; 2-[(2-acryloylethyl)dimethylammonio]ethyl 2-methyl phosphate; 2-(acryloyloxyethyl)-2'-(trimethylammonium)ethyl phosphate; [(2-acryloylethyl)dimethylammonio]methyl phosphonic acid; 2-methacryloyloxyethyl phosphorylcholine ("MPC"); 2-[(3-acrylamidopropyl)dimethylammonio]ethyl 2'-isopropyl phosphate ("AAPI"); 1-vinyl-3-(3-sulfopropyl) imidazolium hydroxide; (2-acryloxyethyl)carboxymethyl methylsulfonium chloride; 1-(3-sulfopropyl)-2-vinylpyridinium betaine; N-(4-sulfobutyl)-N-methyl-N,N-diallylamine ammonium betaine ("MDABS"); N,N-diallyl-N-methyl-N-(2-sulfoethyl)ammonium betaine; similar monomers, and combinations thereof.

Generally, the amine-containing polymers used in this disclosure may take the form of water-in-oil emulsions, dry powders, dispersions, or aqueous solutions. In certain embodiments, the amine-containing polymers may be prepared via free radical polymerization techniques in water using free radical initiation.

ASA is commonly produced by the high temperature reaction of maleic anhydride ("MA") and a long chain internal olefin where the olefin to MA ratio is usually greater than 1. The type of olefin used to produce the ASA can have a significant impact on product performance. The olefins employed in commercial ASA sizes typically contain a carbon chain length of 16-18. However, it should be understood that ASA useful in the oil-in-water emulsions described herein may be prepared from olefins of different carbon chain lengths.

ASA compounds prepared from MA and various internal olefins are disclosed in U.S. Pat. No. 3,821,069. ASA compounds prepared from MA and mixtures of olefins, including internal olefins, are also disclosed in U.S. Pat. No. 6,348,132. The preparation of internal olefins by a metathesis reaction and a utility of the metathesized olefins in the preparation of ASA compounds are disclosed in U.S. Patent Application Publication No. 2003/0224945. The disclosures of each of these references is herein incorporated by reference.

Stabilized size emulsions such as the oil-in-water emulsions of the present disclosure can be generally prepared using the procedures taught in colloid science (e.g., S. E. Friberg & S. Jones, "Emulsions," in the Encyclopedia of Chemical Technology, Vol. 9 (4th ed.), the disclosure of which is herein incorporated by reference). The general concept consists of imparting energy to a mixture of hydrophobic material (size in this case) and water in the presence of a stabilizer, which results in "small" droplets or particles of the hydrophobic material suspended in the aqueous phase, thereby producing an oil-in-water emulsion. The mixing can be accomplished in any number of ways with the method of mixing being immaterial to the application as long as the desired results are achieved.

Desired results normally refer to the average particle size and particle size distribution. Mechanical means for emulsification, for example, can include high-speed agitators, mechanical homogenizers, or turbine pumps. The latter is frequently employed to prepare stabilized size emulsions. The equipment must be capable of preparing an emulsion particle size in the range generally between about 0.01 and about 10 microns. A preferred particle size is between about 0.5 to 3 microns. The emulsion size here refers to the median diameter of a volume percent distribution obtained with a Malvern Mastersizer laser diffraction instrument, available from Malvern Instruments, Ltd., Malvern, U.K. The median is defined as the diameter where 50% of the particles are greater than this value, and 50% are less than the value. The size of the emulsion can be controlled by the amount of energy and stabilizer added. Normally, the emulsion would be prepared from a mixture of the size, the polymeric stabilizer, and enough water to achieve desired dilution. As noted in, for example, U.S. Pat. Nos. 4,657,946 and 7,455,751, the disclosures of which are herein incorporated by reference, a surfactant of the sorts identified therein can be added to enhance the emulsification.

The oil-in-water emulsions or the ASA of the present disclosure may be used as an internal size or a surface size. Surface sizes are applied as a liquid solution or dispersion to the dry sheet, usually in a size press or at the calender stack. For example, in a simple puddle-type size press, the paper sheet runs through a pond or puddle of sizing solution and into a nip formed between two press rolls. Alternatively, the size solution may be sprayed into the nip on each side of the sheet and the nip forces the sizing solution into the sheet.

Internal sizes are typically added to the papermaking furnish in the wet end of the paper machine, prior to the headbox and the start of the dewatering process. The sizes are retained in the sheet of paper through the use of their emulsification polymers and/or typical retention and drainage additives like coagulants, flocculants, and/or microparticles. In an effort to minimize deposition problems commonly associated with ASA, the internal sizes are usually added as close as possible to the forming section.

Internal sizes may also be sprayed on the surface of the sheet after formation of the wet web, for example, using a spray boom with appropriately placed nozzles across the width of the papermachine. The spray nozzles should be designed and spaced to ensure even distribution of the compound on the sheet without disruption of the fibrous mat. The placement of the spray boom on the machine may be anywhere along the length of the forming zone where gravity and vacuum dewatering occurs or immediately prior to the press section or the dryer section. A commonly used location for spraying chemical additives onto a paper sheet is between the wet line and the couch roll of a Fourdrinier-type papermachine. The wet line is the location where the appearance of the wet web changes from a glossy, reflective surface to that of a dry, matte surface.

In certain embodiments, the oil-in-water emulsion of this disclosure may optionally be used in combination with one or more materials that are cationic in nature or capable of ionizing or dissociating in such a manner as to produce one or more cations or other positively charged moieties. Such cationic agents have been found useful as a means for aiding in the retention of sizing compositions in paper, and those of skill in the art commonly refer to these as retention agents, aids, packages, and the like. Among the materials that may be employed as cationic agents in the sizing process are, for example, alum, aluminum chloride, polyaluminum chloride, long chain fatty amines, sodium aluminate, substituted polyacrylamide, chromic sulfate, animal glue, cationic thermosetting resins, and polyamide polymers. Particularly suitable cationic agents include, for example, cationic starch derivatives, including primary, secondary, tertiary, or quaternary amine starch derivatives and other cationic nitrogen substituted starch derivatives. Such derivatives may be prepared from all types of starches including corn, tapioca, potato, waxy maize, wheat, and rice. Moreover, they may be in their original granule form or they may be converted to pregelatinized, cold water soluble products and/or employed in liquid form.

The cationic agents may be added to the stock, i.e., the pulp slurry, either prior to, along with, or after the addition of the oil-in-water emulsion. To achieve maximum distribution, it may be preferable to add the cationic agent subsequent to or in combination with the oil-in-water emulsion. The addition to the stock of the oil-in-water emulsion and/or cationic agent may take place at any point in the papermaking process prior to the ultimate conversion of the wet pulp into a dry web or sheet. Thus, for example, the present sizing compositions may be added to the pulp while the latter is in the headbox, beater, hydropulper, and/or stock chest.

To obtain advantageous sizing, it is generally desirable to uniformly disperse the sizing agents throughout the fiber slurry in as small a particle size as possible, in certain embodiments smaller than 2 micron. This may be achieved, for example, by emulsifying the sizing compositions prior to addition to the stock. Emulsification is typically performed using mechanical means such as, for example, high speed agitators, mechanical homogenizers, and/or through the addition of a suitable emulsifying agent.

The inventors have discovered that the employment of an oil-in-water emulsion comprising ASA emulsified with an amine-containing polymer (particularly diallylamine ("DAA")) in the papermaking process surprisingly provides outstanding improvements in sizing performance without significantly affecting particle size distribution parameters. In certain embodiments, the amine-containing polymer is a diallylamine-acrylamide ("DAA-AcAm") copolymer.

The oil-in-water emulsions are useful for the sizing of paper prepared from all types of both cellulosic and combinations of cellulosic with non-cellulosic fibers. The cellulosic fibers that may be used include, for example, sulfate (a.k.a. Kraft), sulfite, soda, neutral sulfite semi-chemical ("NSSC"), thermomechanical ("TMP"), chemi-thermomechanical ("CTMP"), groundwood ("GWD"), and any combination of these fibers. Any of the foregoing cellulosic fibers may be bleached or unbleached. These designations refer to wood pulp fibers that have been prepared by any of a variety of processes that are typically used in the pulp and paper industry. In addition, synthetic fibers of the viscose rayon or regenerated cellulose type may be used.

Various types of pigments and fillers may be added to the paper that is to be treated using the methods and compositions of this disclosure. Such materials include, for example, clay, talc, titanium dioxide, calcium carbonate, calcium sulfate, and diatomaceous earths. Other additives, including, for example, alum, as well as other sizing agents may also be included in the present methods and compositions.

The amount of the oil-in-water emulsion that may be dosed into the papermaking process may vary depending on, for example, the particular sizing composition employed, the particular pulp involved, the specific operating conditions, the contemplated end-use of the paper, and the like. Typical concentrations of the sizing composition, based on the dry weight of the pulp in the finished sheet or web, may range from 0.01 pounds to 100 pounds of the oil-in-water emulsion per ton dry fiber (lb/ton) (5 grams to 50 kilograms per metric ton dry fiber), with a more preferred range of 0.25 to 20 pounds per ton dry fiber (125 grams to 10 kilograms per metric ton dry fiber). In certain embodiments, the sizing emulsion may be employed at a dose of from 0.5 to 5 lb/ton dry fiber (250 grams to 2.5 kilograms per metric ton dry fiber), with 1 to 4 lb/ton dry fiber (500 grams to 2 kilograms per metric ton dry fiber) being a preferred dose range.

As previously discussed, in certain embodiments, the oil-in-water emulsion is emulsified with a DAA-containing polymer as an emulsifying agent. The polymer may be a DAA homopolymer, a copolymer of DAA, or any polymer that at least partially comprises DAA. The concentration of the polymer may vary depending on, for example, the particular sizing composition employed, the particular pulp involved, the specific operating conditions, the contemplated end-use of the paper, and the like. Typical concentrations range from 1 to 5 parts by weight polymer per 10 parts by weight ASA, including 1 to 4 parts by weight polymer per 10 parts by weight ASA.

The mole percentage of DAA in the amine-containing polymer is also an important variable when treating paper according to this disclosure. In certain embodiments, the amine-containing polymer is a diallylamine homopolymer. In other embodiments, the amine-containing polymer is a DAA/AcAm copolymer. In yet other embodiments, the amine-containing polymer is a mixture of DAA homopolymer and DAA/AcAm copolymer. An amine-containing polymer consisting of or consisting essentially of DAA (a DAA homopolymer or essentially a DAA homopolymer) can be expected to perform at least as well as the DAA/AcAm copolymer, as the sizing performance of the emulsion has been noticeably improved for DAA/AcAm copolymers when a greater DAA mole percentage is employed.

In those embodiments, where a DAA/AcAm copolymer embodiment is employed, the mole percentage of DAA in the DAA/AcAm copolymer can be within a range of 1 to 99 percent. The DAA/AcAm copolymer may be primarily made up of DAA, i.e., may comprise more DAA monomer units than AcAm monomer units. In those embodiments, where cost is a deciding factor in terms of composition of the oil-in-water emulsion, a more preferable mole percentage of DAA in the amine-containing polymer may be 10 to 60, and including 10 to 40.

In certain embodiments, the oil-in-water emulsion comprises 0.01-40 percent by weight ASA. In other embodiments, the oil-in-water emulsion comprises 1-20 percent by weight ASA.

In certain embodiments, the oil-in-water emulsion comprises 0.001-20 percent by weight amine-containing polymer. In other embodiments, the oil-in-water emulsion comprises 0.1-10 percent by weight amine-containing polymer. In certain embodiments, the amine-containing polymer is DAA/AcAm copolymer which is present in an amount of 0.001-20 percent by weight.

In certain embodiments, the oil-in-water emulsion comprises 8-12 percent by weight ASA. In certain embodiments, the oil-in-water emulsion comprises 1-5 percent by weight polymer. In certain embodiments, the oil-in-water emulsion comprises 8-12 percent by weight ASA and 1-5 percent by weight polymer. In certain embodiments, the weight percentage of polymer-to-ASA in the oil-in-water emulsion is 10-40%. In a preferred embodiment, the polymer-to-ASA weight percentage is 28-32%. For example, a 30% weight percentage of polymer-to-ASA would have 0.3 grams of polymer per 1 gram of ASA. In other words, a 30% weight percentage of polymer-to-ASA is the same as a polymer to ASA weight ratio of 0.3.

In certain embodiments, the oil-in-water emulsion is added to the papermaking process at a point selected from the group consisting of: wet end; prior to a headbox; at the headbox; directly to the paper; at the size press; and any combination thereof.

In certain embodiments, a mixing chamber is used to introduce the oil-in-water emulsion into the papermaking process. Examples of such mixing chambers are disclosed in U.S. Pat. Nos. 7,550,060; 7,785,442; 7,938,934; and 7,981,251, the disclosures of each of which are herein incorporated by reference (e.g., PARETO Mixing Technology, available from Nalco Company, 1601 West Diehl Road, Naperville, Ill. 60563), and the Ultra Turax, model no. UTI-25 (available from IKA® Works, Inc., Wilmington, N.C.). It is envisioned that any suitable reactor or mixing device/chamber may be utilized in the methods disclosed herein to introduce the oil-in-water emulsion.

The foregoing may be better understood by reference to the following examples, which are intended for illustrative purposes and are not intended to limit the scope of the invention.

EXAMPLES

The effects of emulsifying ASA with DAA/AcAm copolymer were investigated in a laboratory handsheet study using a corrugated cardboard furnish. The study focused on answering the following questions:

1. Does the ASA emulsification with the DAA/AcAm copolymer result in distinct particle size distributions relative to a typical emulsifying agent?
2. Does sizing response increase with the ASA emulsification with the DAA/AcAm copolymer relative to a typical emulsifying agent?
3. Does the DAA/AcAm:ASA ratio affect the sizing response?

Emulsions having 10% ASA by weight were prepared in a laboratory miniblender. Water, emulsifier, and ASA were sequentially added and mixed for 120 seconds. Samples were extracted at 120 seconds (90 seconds for the control samples) and particle size distribution measurements were obtained using light scattering techniques. The emulsions comprising the DAA/AcAm copolymer obtained after 120 seconds of mixing were further diluted and used for the handsheets. The control samples (i.e., Examples 1-3) employed an acrylamide/dimethylaminoethyl methacrylate methyl chloride quaternary copolymer as their emulsifier. The examples according to the present disclosure (i.e., Examples 4-15) used a DAA/AcAm copolymer as their emulsifier. Two DAA/AcAm copolymers, having different DAA mole percents, were tested and are denoted in Table 1 as DAA/AcAm-1 and DAA/AcAm-2. DAA/AcAm-1 contains 15 mole percent DAA, and DAA/AcAm-2 contains 35 mole percent DAA.

The target basis weight for the handsheets was 80 g/m$^2$. Three replicate sheets were prepared for each experimental condition. The 0.6% thin stock for each handsheet was mixed in a Dynamic Drainage Jar at 800 rpm. The desired amount of the ASA emulsion, a polyaluminum chloride additive, and a cationic flocculant were added in 15-second intervals. After mixing, the basesheet was formed in a handsheet mold using an 80-mesh screen, pressed in a static press at 0.5 MPa for 5 minutes, and dried by passing the sheets through a drum dryer for one minute at about 210° F.

The resistance to liquid penetration was determined using the Hercules Sizing Test with a 25% formic acid, naphthol green dye solution at 80% reflectance. The conditions and results are recited in Table 1 below.

TABLE 1

Results of the experiments.

| Condition | Polymer Emulsifier | Polymer to ASA Weight Ratio | Median Particle Size after Mixing for 120 sec* | % of Particle Volume >2 µm after Mixing for 120 sec* | ASA, lb/ton | Hercules Sizing Test Results, seconds |
|---|---|---|---|---|---|---|
| 1 | Control | 0.14 | 1.04 | 18.23 | 3.0 | 60.9 |
| 2 | Control | 0.14 | 1.04 | 18.23 | 3.5 | 63.9 |
| 3 | Control | 0.14 | 1.04 | 18.23 | 4.0 | 70.0 |
| 4 | DAA/AcAm-1 | 0.14 | 1.12 | 17.64 | 3.0 | 79.3 |
| 5 | DAA/AcAm-1 | 0.14 | 1.12 | 17.64 | 3.5 | 79.6 |
| 6 | DAA/AcAm-1 | 0.14 | 1.12 | 17.64 | 4.0 | 83.6 |
| 7 | DAA/AcAm-2 | 0.14 | 1.08 | 19.47 | 3.0 | 81.3 |
| 8 | DAA/AcAm-2 | 0.14 | 1.08 | 19.47 | 3.5 | 88.9 |
| 9 | DAA/AcAm-2 | 0.14 | 1.08 | 19.47 | 4.0 | 106.1 |
| 10 | DAA/AcAm-1 | 0.30 | 1.00 | 7.63 | 3.0 | 153.1 |
| 11 | DAA/AcAm-1 | 0.30 | 1.00 | 7.63 | 3.5 | 151.1 |
| 12 | DAA/AcAm-1 | 0.30 | 1.00 | 7.63 | 4.0 | 134.1 |
| 13 | DAA/AcAm-2 | 0.30 | 1.06 | 9.67 | 3.0 | 185.5 |
| 14 | DAA/AcAm-2 | 0.30 | 1.06 | 9.67 | 3.5 | 197.9 |
| 15 | DAA/AcAm-2 | 0.30 | 1.06 | 9.67 | 4.0 | 175.7 |

*Control samples were extracted after 90 seconds.

As can be seen from the data in Table 1, the use of an amine-containing polymer results in improved resistance to liquid penetration, as evidenced by the higher results obtained from the Hercules Sizing test in Examples 4-15, as compared to the controls. Moreover, the use of higher amounts of amine-containing polymer:ASA provide further improved resistance to liquid penetration, which is illustrated in Examples 10-15.

All patents referred to herein, are hereby incorporated herein by reference, whether or not specifically done so within the text of this disclosure.

To the extent that the terms "include," "includes," or "including" are used in the specification or the claims, they are intended to be inclusive in a manner similar to the term "comprising" as that term is interpreted when employed as a transitional word in a claim. Furthermore, to the extent that the term "or" is employed (e.g., A or B), it is intended to mean "A or B or both A and B." When the applicants intend to indicate "only A or B but not both," then the term "only A or B but not both" will be employed. Thus, use of the term "or" herein is the inclusive, and not the exclusive use. See Bryan A. Garner, A Dictionary of Modern Legal Usage 624 (2d ed. 1995). Also, to the extent that the terms "in" or "into" are used in the specification or the claims, it is intended to additionally mean "on" or "onto." Furthermore, to the extent that the term "connect" is used in the specification or the claims, it is intended to mean not only "directly connected to," but also "indirectly connected to" such as connected through another component or components. In the present disclosure, the words "a" or "an" are to be taken to include both the singular and the plural. Conversely, any reference to plural items shall, where appropriate, include the singular.

All ranges and parameters disclosed herein are understood to encompass any and all sub-ranges assumed and subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more (e.g., 1 to 6.1), and ending with a maximum value of 10 or less (e.g., 2.3 to 9.4, 3 to 8, 4 to 7), and finally to each number 1, 2, 3, 4, 5, 6, 7, 8, 9, and 10 contained within the range.

While the present disclosure has been illustrated by the description of embodiments thereof, and while the embodiments have been described in considerable detail, it is not the applicants' intent to restrict or in any way limit the scope of the appended claims to such detail. Additional advantages and modifications will readily appear to those skilled in the art. Therefore, the disclosure, in its broader aspects, is not limited to the specific details, the representative apparatus, or the illustrative examples shown and described. Accordingly, departures may be made from such details without departing from the spirit or scope of the applicants' general inventive concept.

We claim:

1. A method of sizing paper produced by a papermaking process, the method comprising:
adding an oil-in-water emulsion to the papermaking process; wherein the oil-in-water emulsion comprises alkenyl succinic anhydride emulsified with a polymer comprising from 10 to 60 mole percent of at least one primary or secondary amine-containing allyl-monomer, and the remainder of the polymer comprising a nonionic monomer selected from the group consisting of: acrylamide, methacrylamide, N,N-dimethylacrylamide, N,N-diethylacrylamide, N-isopropylacrylamide, N-vinylformamide, N-vinylmethylacetamide, N-vinyl pyrrolidone, hydroxyethyl methacrylate, hydroxyethyl acrylate, hydroxypropyl acrylate, hydroxypropyl methacrylate, N-t-butylacrylamide, N-methylolacrylamide, vinyl acetate, vinyl alcohol, and combinations thereof;
wherein the oil-in-water emulsion has an emulsion particle size ranging from about 0.01 to about 10 microns.

2. The method of claim 1, wherein the at least one primary or secondary amine-containing allyl-monomer is a compound of Formulae I or II or a salt thereof

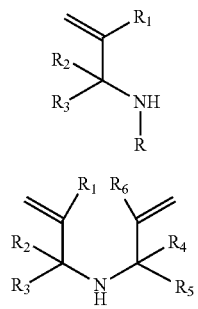

wherein R is hydrogen or alkyl; $R_1$, $R_2$, $R_3$, $R_4$, $R_5$, $R_6$ are each independently selected from the group consisting of: hydrogen, alkyl, and alkoxylalkyl.

3. The method of claim 1, wherein the polymer is hydrolyzed.

4. The method of claim 1, wherein the polymer and the alkenyl succinic anhydride are present in the oil-in-water emulsion at a weight ratio ranging from 1 part to 5 parts polymer per 10 parts alkenyl succinic anhydride.

5. The method of claim 1, wherein the polymer and the alkenyl succinic anhydride are present in the oil-in-water emulsion at a polymer-to-alkenyl succinic anhydride ratio ranging from 28 to 32 parts polymer per 100 parts alkenyl succinic anhydride.

6. The method of claim 1, wherein the oil-in-water emulsion is dosed into the papermaking process at a rate ranging from 0.01 to 100 pounds of oil-in-water emulsion per ton of dry fiber.

7. The method of claim 1, further comprising adding a cationic agent to the papermaking process.

8. The method of claim 7, wherein the cationic agent is selected from the group consisting of: alum, aluminum chloride, polyaluminum chloride, long chain fatty amines, sodium aluminate, substituted polyacrylamide, chromic sulfate, animal glue, cationic thermosetting resins, a polyamide polymer, an amine-containing starch derivative, and combinations thereof.

9. The method of claim 1, wherein the oil-in-water emulsion is added to the papermaking process via a mixing chamber.

10. The method of claim 1, wherein the oil-in-water emulsion is dosed into the papermaking process at a rate ranging from 0.25 to 20 pounds of oil-in-water emulsion per ton of dry fiber.

11. The method of claim 1, wherein the oil-in-water emulsion is dosed into the papermaking process at a rate ranging from 1 to 4 pounds of oil-in-water emulsion per ton of dry fiber.

12. The method of claim 1, wherein the at least one primary or secondary amine-containing allyl-monomer has a molecular weight less than 2,000,000 Daltons.

13. An oil-in-water emulsion comprising alkenyl succinic anhydride emulsified with a polymer consisting of from 10 to 60 mole percent of diallylamine, and a nonionic monomer selected from the group consisting of: acrylamide, methacrylamide, N,N-dimethylacrylamide, N,N-diethylacrylamide, N-isopropylacrylamide, N-vinylformamide, N-vinylmethylacetamide, N-vinyl pyrrolidone, hydroxyethyl methacrylate, hydroxyethyl acrylate, hydroxypropyl acrylate, hydroxypropyl methacrylate, N-t-butylacrylamide, N-methylolacrylamide, vinyl acetate, vinyl alcohol, and combinations thereof;
wherein the oil-in-water emulsion has an emulsion particle size ranging from about 0.01 to about 10 microns.

14. The oil-in-water emulsion of claim 13, wherein 1 to 5 parts by weight of the polymer are present in the oil-in-water emulsion per 10 parts by weight of the alkenyl succinic anhydride.

15. The oil-in-water emulsion of claim 13, wherein the oil-in-water emulsion comprises from 8 to 12 percent by weight alkenyl succinic anhydride.

16. The oil-in-water emulsion of claim 13, wherein the oil-in-water emulsion comprises from 1 to 5 percent by weight polymer.

17. The oil-in-water emulsion of claim 13, wherein the oil-in-water emulsion comprises from 8 to 12 percent by weight alkenyl succinic anhydride, and from 1 to 5 percent by weight polymer.

18. A method of sizing paper produced by a papermaking process, the method comprising:
adding the oil-in-water emulsion of claim 13 to the papermaking process; wherein the oil-in-water emulsion is added in an amount sufficient to size the paper produced by the papermaking process.

19. The method of claim 18, wherein the papermaking process produces a product suitable for use as a beverage container.

20. The method of claim 18, wherein the oil-in-water emulsion is added to the papermaking process via a mixing chamber.

* * * * *